United States Patent [19]
Tregoat et al.

[11] Patent Number: 5,736,429
[45] Date of Patent: Apr. 7, 1998

[54] METHOD OF FORMING A LAYER OF SILICA TO BE ELIMINATED SUBSEQUENTLY AND METHOD FOR MOUNTING AN INTEGRATED OPTICAL COMPONENT

[75] Inventors: Denis Tregoat, Gif Sur Yvette; Claude Artigue, Bourg La Reine; Frédéric Pommereau, Bretigny Sur Orge; Estelle Derouin, Palaiseau, all of France

[73] Assignee: Alcatel N.V., Rijswijk, Netherlands

[21] Appl. No.: 566,122

[22] Filed: Dec. 1, 1995

[30] Foreign Application Priority Data

Dec. 5, 1994 [FR] France .................. 94 14582

[51] Int. Cl.⁶ .................. G02B 6/12; G02B 6/42
[52] U.S. Cl. .................. 438/31; 438/723; 438/975; 385/131; 156/653.1; 216/72
[58] Field of Search .................. 437/228, 924; 385/129–131, 49; 156/653.1; 216/72; 438/31, 723, 975

[56] References Cited

U.S. PATENT DOCUMENTS

| | | | |
|---|---|---|---|
| 4,946,251 | 8/1990 | Ashwell et al. | 350/96.34 |
| 5,059,475 | 10/1991 | Sun et al. | 385/130 |
| 5,299,276 | 3/1994 | Okamura et al. | 385/130 |
| 5,483,613 | 1/1996 | Bruce et al. | 385/129 |

FOREIGN PATENT DOCUMENTS

| | | |
|---|---|---|
| 0118185A1 | 9/1984 | European Pat. Off. . |
| 0424905A3 | 5/1991 | European Pat. Off. . |
| 0 504 882 A3 | 9/1992 | European Pat. Off. . |
| 0504882A3 | 9/1992 | European Pat. Off. . |
| 05 - 127030 | 5/1993 | Japan . |
| 93/16403 | 8/1993 | WIPO . |

OTHER PUBLICATIONS

Patent Abstracts of Japan, vol. 017, No. 495 (P–1608) Sep. 7, 1993, corresponding to JP–A–05 127030 (Fujikura LTD) May 25, 1993.

Patent Abstracts of Japan, vol. 016, No. 241 (P–1363) Jun. 3, 1992 corresponding to JP–A–04 052606 (Furukawa Electric Co, Ltd) Feb. 20, 1992.

Primary Examiner—John Niebling
Assistant Examiner—Kevin F. Turner
Attorney, Agent, or Firm—Sughrue, Mion, Zinn, Macpeak & Seas, PLLC

[57] ABSTRACT

In a method for mounting an integrated optical component, a starting base structure includes a silica lower confinement layer and the cores of the future optical waveguides. This basic structure includes an alignment abutment so that a component to be mounted can be subsequently aligned with these waveguides. A silicon barrier layer is deposited on the abutment. Flame hydrolysis deposition is then used to deposit an upper silica layer to constitute the upper confinement layer of the waveguides. This silica layer also covers the alignment abutment, however. For this reason the region of the abutment is then etched by reactive ion etching to expose the abutment, which is protected from this etching by the barrier layer. The component to be mounted is then located relative to the abutment.

6 Claims, 2 Drawing Sheets

METHOD OF FORMING A LAYER OF SILICA TO BE ELIMINATED SUBSEQUENTLY AND METHOD FOR MOUNTING AN INTEGRATED OPTICAL COMPONENT

BACKGROUND OF THE INVENTION

1. Field of the Invention

The present invention concerns a method of forming a layer of silica to be eliminated subsequently.

2. Description of the Prior Art

A method of this kind is known in itself and will be described first: the layer of silica to be formed is deposited onto an existing base structure. This layer of silica is referred to as the "upper silica layer". At least part of this layer is eliminated subsequently by a silica etching treatment. This treatment can be used to eliminate all the upper silica layer. In this case it is effected only after intermediary operations during which this layer is of benefit. It enables a layer that is not wanted after such intermediary operations to be eliminated. As explained below, it can also be used to eliminate only parts of the upper silica layer that are no longer wanted, whilst retaining wanted parts of this layer. These unwanted areas may have been of no utility at any time. They are typically present because the best way to form the wanted areas is to begin by forming a continuous layer comprising both the wanted areas and the unwanted areas, followed by selective elimination of the unwanted areas.

In a known method of producing integrated optical components for telecommunication systems the upper silica layer is formed by the Plasma Enhanced Chemical Vapor Deposition (PECVD) process. The etching treatment is then a dry etch such as Reactive Ion Etching (RIE).

This has various drawbacks. One is that the etching treatment can damage the base structure, especially if the latter is also made of silica. Another is that the PECVD process is relatively costly, in particular more costly than the flame hydrolysis deposition (FHD) process.

The aim of the present invention is both to protect the base structure and to reduce the cost of depositing the upper silica layer. It differs from the known method mentioned above in that the base structure is protected from the silica etching treatment by a barrier layer of silicon, the upper silica layer being deposited by flame hydrolysis.

SUMMARY OF THE INVENTION

The method of the invention uses a barrier layer of silicon on which a protective silica layer is formed at a relatively low temperature, in all cases a temperature lower than that required for the flame hydrolysis deposition process. This enables the upper silica layer to be deposited by means of the FHD process without risk of destroying the silicon layer as the result of oxidation caused by the relatively high temperatures (1 350° C.) of the FHD process.

How the present invention may be put into effect is described in more detail below, by way of non-limiting example and with reference to the appended diagrammatic drawings. If an item is shown in more than one figure it is always identified by the same reference symbol.

DETAILED DESCRIPTION OF THE PREFERRED EMBODIMENT

Figure 1:
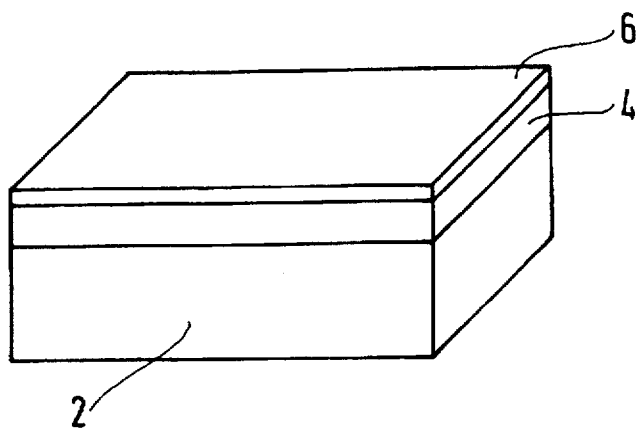
FIGS. 1 through 9 show successive steps in the manufacture of an integrated optical device using methods in accordance with the present invention.

A number of advantageous features of the method in accordance with the invention for forming a silica layer will first be described in general terms.

The barrier layer is preferably between 100 nm and 1,000 nm thick, preferably between 250 nm and 500 nm thick.

After depositing the barrier layer and before depositing the upper silica layer, a protective silica layer is deposited on top of the barrier layer at a temperature lower than that required for flame hydrolysis deposition of silica. One consequence of the presence of this protective layer is that the thickness of the barrier layer does not have to be artificially increased to prevent the risk of oxidation.

The protective silica layer is preferably deposited by plasma enhanced chemical vapor deposition and is between 250 nm and 1,000 nm thick.

The method in accordance with the present invention for mounting an integrated optical component will now be described in general terms. This method is used when the component to be mounted has to align with an optical waveguide group including at least one waveguide core buried in the silica and typically a plurality of parallel waveguides 14. It includes the following steps:

- definition of a silica etching treatment adapted to eliminate a silica layer, this treatment typically being reactive ion etching,
- formation of a base structure including a silica lower confinement layer 4 for said group, said structure also including each waveguide core and having an alignment abutment for subsequent alignment of the component to be mounted relative to said group,
- depositing onto the alignment abutment a barrier layer 8 of silicon to resist said reactive ion etching treatment,
- forming a protective silica layer 9 on top of the barrier layer 8 at a temperature less than that required for flame hydrolysis deposition of silica,
- depositing by flame hydrolysis an upper silica layer 12 onto the base structure to constitute an upper confinement layer covering the lower confinement layer 4 and each waveguide core to constitute said optical waveguide group, said upper silica layer 12 also covering the alignment abutment,
- localized etching of the upper silica layer 12 by said silica etching treatment, said etching being localized in the region of the abutment to eliminate the upper confinement layer 12 therein to expose the abutment protected by the barrier layer 8, and
- placement of the component to be mounted, this component being aligned by virtue of its bearing against the alignment abutment.

The waveguide cores 14 typically project from the lower confinement layer in the base structure, causing recesses 15 in the form of gaps between the cores. The deposition of the upper silica layer fills in the gaps between cores to form the upper confinement layer.

The gaps between the cores are channels, typically 250 μm wide and 10 μm deep. An important advantage of the present invention is that the flame hydrolysis deposition of silica fills in these gaps perfectly, whereas the PECVD process has been known to cause heterogeneity in the silica between two waveguide cores, causing light losses in the waveguide of the integrated optical device finally obtained.

The production of an integrated optical device will now be described, including use of the method in accordance with the invention for mounting a component.
}

The device to be produced has to include a semiconductor strip 60 incorporating a plurality of buried heterostructure semiconductor lasers 62. This strip constitutes the component to be mounted previously referred to. This device also includes the optical waveguides previously mentioned, shown by their cores 14. The heterostructure 62 must be aligned with respective cores 14. To this end, during manufacture of the strip 60 and the base structure 10 the heterostructures and the cores are made parallel and at the same regular pitch, and the position of the optical waveguide group comprising these cores is accurately defined relative to lateral abutments 16 and the floor 18, and likewise the position of the group of laser heterostructures is accurately defined relative to locating flanks 64 and a lower face of the strip 60. These positions are such that the necessary alignments are achieved when the flanks bear against the abutments and the lower face bears against the floor.

The present invention enables effective bearing engagement to be obtained at the correct time.

The steps in the manufacture of the integrated optical component are as follows:

Referring to FIG. 1, a silicon substrate 2 is formed. A lower confinement layer 4 of pure silica is deposited on this substrate, for example using the FHD process. A core layer 6 of silica doped to increase its refractive index is then deposited on top of the layer 4 using the same process.

Figure 2:
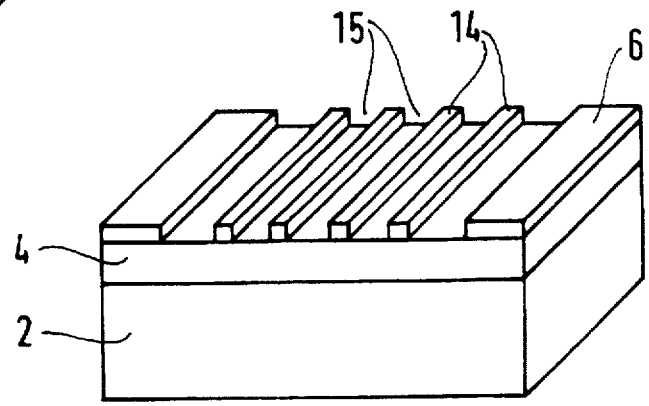

Referring to FIG. 2, the layer 6 is etched to form the cores 14 upstanding from the lower confinement layer 4.

Figure 3:
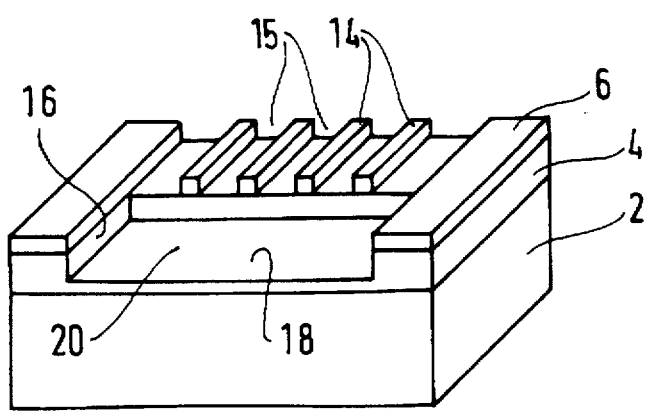

Referring to FIG. 3, the latter layer 4 is etched to form a recess 20 with a floor 18 and lateral flanks constituting abutments 16.

Figure 4:
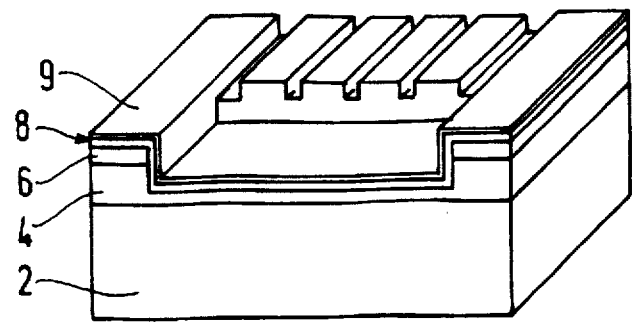

Referring to FIG. 4, a silicon barrier layer 8 is deposited on which a protective silica layer 9 is further deposited.

Figure 5:
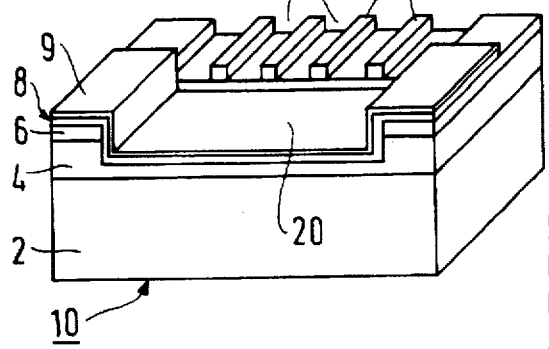

Referring to FIG. 5, this barrier layer 8 is etched so that it remains only in and at the sides of the recess 20.

Figure 6:
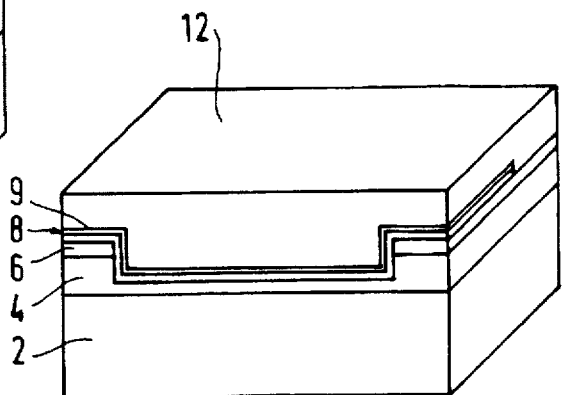

Referring to FIG. 6, the upper silica layer 12 is deposited. This first fills in the gaps between the cores 15 and then forms an upper confinement layer. This produces the optical waveguide group previously referred to. Unfortunately, this deposit also fills in the recess 20.

Figure 7:
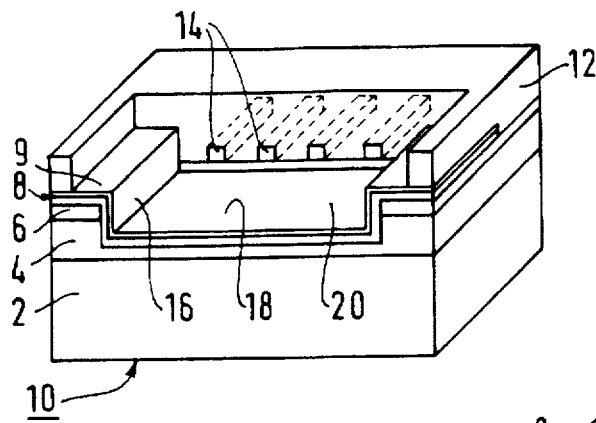

Referring to FIG. 7, the upper silica layer 12 is etched to expose the recess 20 so that the abutments 16 and the floor 18 are again exposed.

This etching is carried out using the reactive ion etching process. The barrier layer 8 protects the abutments and the floor against this etching.

Figure 8:
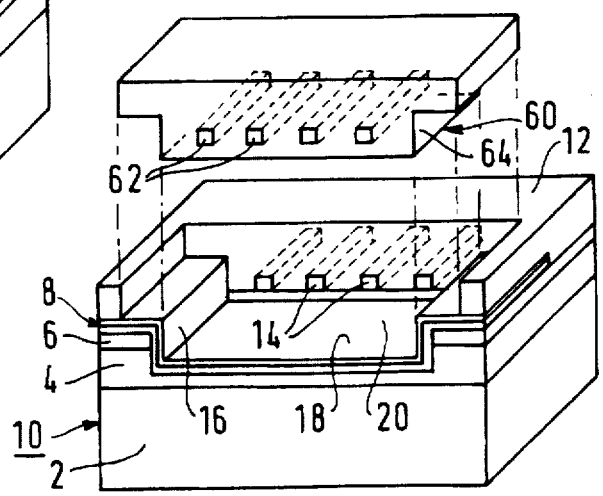
Figure 9:
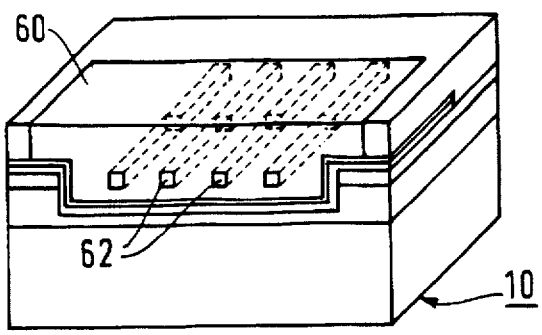

Referring to FIG. 8, the strip 60 is placed in the recess to form the integrated optical device 10 shown in FIG. 9.

There is claimed:

1. Method of forming an upper layer of silica on a substrate to be eliminated subsequently by a silica etching treatment capable of eliminating said upper layer of silica but not a barrier layer of silicon, said method comprising the following steps:

depositing a silicon barrier layer onto a base structure, forming a protective silica layer on said barrier layer at a temperature lower than that required for flame hydrolysis deposition of silica, and flame hydrolysis depositing said upper silica layer on said protective silica layer, so that said silica etching treatment can subsequently eliminate said upper silica layer at least locally without damaging said base structure.

2. Method according to claim 1 wherein said barrier layer is between 100 nm and 1000 nm thick.

3. Method according to claim 1 wherein said barrier layer is between 250 nm and 500 nm thick.

4. Method according to claim 1 wherein said protective silica layer is between 250 nm and 1000 nm thick.

5. Method of mounting an integrated optical component to be aligned with an optical waveguide group including at least one waveguide core buried in silica, said method comprising the following steps:

forming a base structure including said at least one waveguide core of said group and an alignment abutment for future alignment of said component to be mounted relative to said group, depositing a silicon barrier layer onto said alignment abutment, forming a protective silica lower confinement layer on said barrier layer at a temperature lower than that required for flame hydrolysis deposition of silica, flame hydrolysis depositing an upper confinement silica layer on said protective silica layer and said at least one waveguide core and to thereby constitute said optical waveguide group with said upper confinement silica layer also covering said alignment abutment, localizing etching said upper confinement silica layer by said silica etching treatment capable of eliminating said upper confinement silica layer but not said silicon barrier layer in the region of said abutment to eliminate said upper silica layer therein and to thereby expose said abutment protected by said barrier layer, and placing said component to be mounted and alignment of said component by bearing engagement therewith on said alignment abutment.

6. Method according to claim 5 wherein said optical waveguide group at least one core comprises a plurality of parallel waveguide cores upstanding on said lower confinement silica layer in said base structure, and said method further comprising producing recesses thereon constituted by gaps between said cores, and then filling in said gaps between said cores before depositing said upper confinement silica layer.

* * * * *